(12) United States Patent
Weifels

(10) Patent No.: US 8,347,752 B2
(45) Date of Patent: Jan. 8, 2013

(54) ACTUATING DEVICE WITH SHIFT CARRIAGE LOCK

(75) Inventor: Carsten Weifels, Barver (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 409 days.

(21) Appl. No.: 12/671,948

(22) PCT Filed: Jul. 30, 2008

(86) PCT No.: PCT/DE2008/050021
§ 371 (c)(1),
(2), (4) Date: Feb. 3, 2010

(87) PCT Pub. No.: WO2009/021509
PCT Pub. Date: Feb. 19, 2009

(65) Prior Publication Data
US 2011/0226079 A1    Sep. 22, 2011

(30) Foreign Application Priority Data
Aug. 14, 2007   (DE) .................. 10 2007 038 495

(51) Int. Cl.
*B60K 20/00*   (2006.01)

(52) U.S. Cl. ............... 74/473.21; 74/473.18; 74/473.24; 74/473.33

(58) Field of Classification Search ............... 74/473.21, 74/473.1, 473.15, 473.18, 473.22, 473.23, 74/473.24, 473.33
See application file for complete search history.

(56) References Cited

U.S. PATENT DOCUMENTS

| 5,689,996 | A | * | 11/1997 | Ersoy ............................. 74/335 |
| 5,791,197 | A | * | 8/1998 | Rempinski et al. ......... 74/473.18 |
| 5,899,115 | A | * | 5/1999 | Kataumi et al. ........... 74/473.18 |
| 6,148,686 | A | * | 11/2000 | Kataumi .................... 74/473.18 |
| 6,325,196 | B1 | * | 12/2001 | Beattie et al. .............. 192/220.4 |
| 6,431,339 | B1 | * | 8/2002 | Beattie et al. .............. 192/220.4 |
| 6,783,480 | B2 | * | 8/2004 | Masuda et al. .................. 477/94 |
| 7,328,782 | B2 | * | 2/2008 | De Jonge .................... 192/220.4 |
| 7,444,899 | B2 | * | 11/2008 | Oda et al. .................... 74/473.21 |
| 7,568,404 | B2 | * | 8/2009 | Grossman et al. ......... 74/473.23 |
| 2002/0029951 | A1 | * | 3/2002 | Beattie et al. .............. 192/220.4 |
| 2004/0162185 | A1 | | 8/2004 | Giefer et al. |
| 2004/0226801 | A1 | * | 11/2004 | De Jonge et al. .......... 192/220.7 |
| 2005/0139031 | A1 | | 6/2005 | Giefer et al. |
| 2006/0032723 | A1 | | 2/2006 | Wilber |

FOREIGN PATENT DOCUMENTS

| DE | 100 03 140 C1 | 8/2001 |
| DE | 102 52 009 A1 | 5/2004 |
| EP | 1 450 078 A | 8/2004 |
| WO | 2006/074644 A | 7/2006 |

* cited by examiner

*Primary Examiner* — Troy Chambers
*Assistant Examiner* — Valentin Craciun
(74) *Attorney, Agent, or Firm* — Davis & Bujold, PLLC

(57) ABSTRACT

An actuating device for transmitting shift commands to an automatic gearbox of a motor vehicle. The actuating device comprises a selector lever which is movable in a selector lane between an automatic shift lane and a sequential shift lane, a shift carriage for transmitting the shift commands to a gearbox transmission element, a separating device for separating the force transmission between the selector lever and the shift carriage, and a locking device for blocking the selector lever in at least one selector lever position. The locking device is set up to block the shift carriage. The shift carriage can be blocked not only in the shift-lock positions but also in the position of the shift carriage which corresponds to the selector lane position of the selector lever.

8 Claims, 3 Drawing Sheets

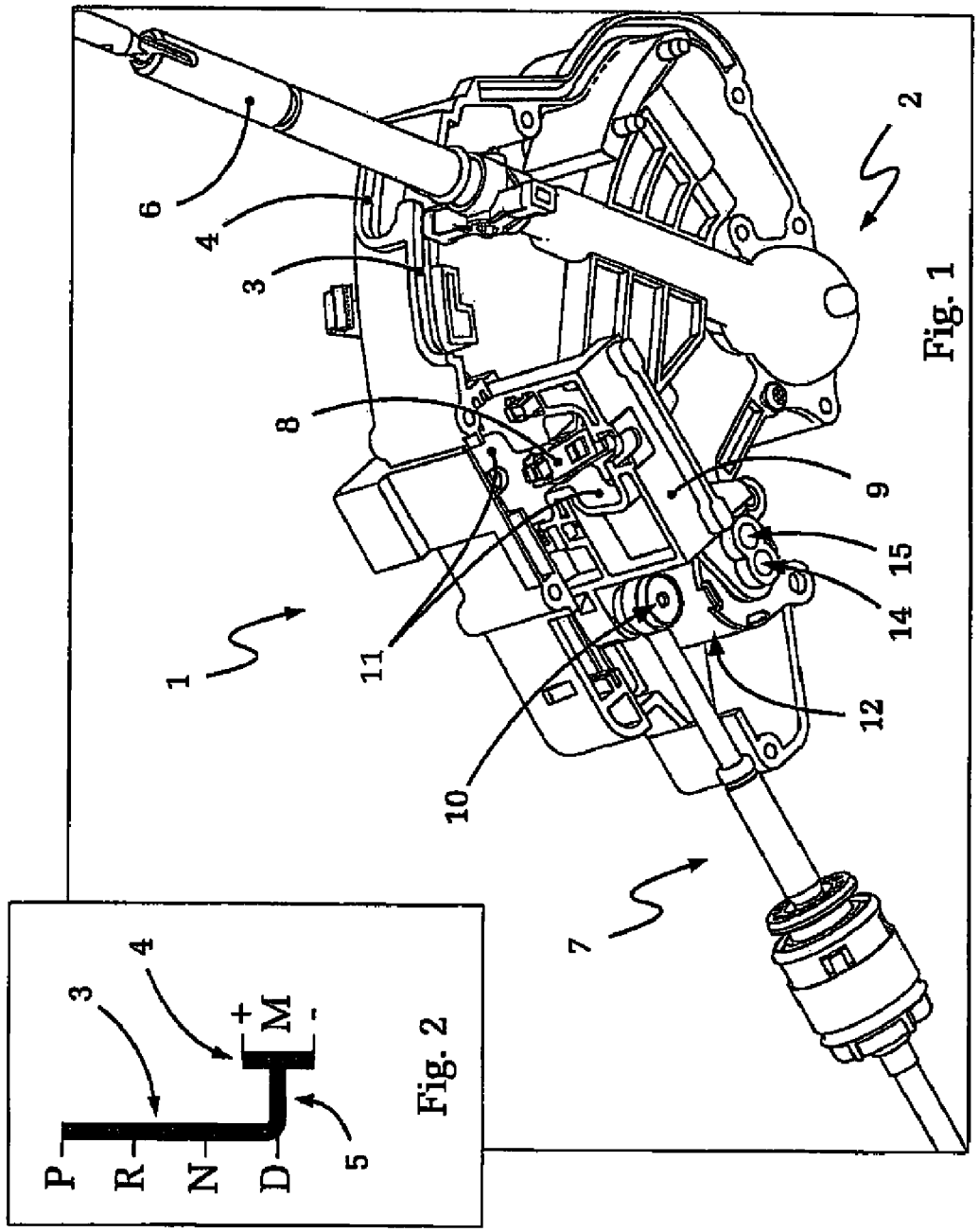

ACTUATING DEVICE WITH SHIFT CARRIAGE LOCK

This application is a National Stage completion of PCT/DE2008/050021 filed Jul. 30, 2008, which claims priority from German patent application serial no. 10 2007 038 495.7 filed Aug. 14, 2007.

FIELD OF INVENTION

The invention relates to an actuating device for transmitting shift commands to an automatic transmission of a.

BACKGROUND OF INVENTION

A similar type of activating device is known to the applicant, for instance, from patent documentation DE 102 52 009 B4. The known actuator device comprises a selector lever which is movable in a selector lane, between an automatic shift lane and a sequence shift lane. The known actuating device also comprises a kinematic transmitter having a shift carriage for a detachable coupling of the selector lever motion to a transmission-transmitter element, for instance towards a gear shift rod or towards a pull cable link connected with the transmission.

It is required in such conventional generic actuating devices, which have an automatic shift lane as well as a sequence shift lane, that the mechanical link, needed to actuate the transmission in the automatic shift lane between the selector lever and the transmission, always open at the point when the selector lever is positioned in the tipping lane or sequential shift lane, respectively, since transmitting the shift commands to the transmission in the sequential shift lane do not—like in the automatic shift lane—happen mechanically but via electrical or electronic means. To provide smooth motion of the selector lever and to avoid, at the same time, unwanted changes of the gear position while the selector lever is moved in the sequential shift lane, there is a mechanical separation in the generic actuating devices between the selector lever and transmission transmitter or a pull cable link, respectively.

At the same time, it is necessary to inhibit kinematic separation, by the selector lever, of the transmission-transmitter element, for instance the pull cable link, with the transmission as long mechanically until the transmitting element, upon return of the selector lever into the automatic shift lane, is again kinematically coupled with the selector lever.

The known state of the art actuating devices achieve detachable, kinematic coupling between the selector lever and the transmission-transmitting element—meaning mostly the transmission pull cable link—and also, at the same time, the locking or blocking of the transmitting elements, when the selector lever is disengaged and positioned in the sequential shift lane, often through an elaborate locking configuration.

Specifically, the state of the art tries to separate the mechanical link between the selector lever with the shift carriage or transmission-transmitting element, respectively, with one and the same sideway lever motion of the selector lever—along the selector lane between the automatic shift lane and the sequence shift lane, as well as additionally and, at the same time, to lock the shift carriage or the transmission-transmitter, respectively, relative to the enclosure of the actuation device, therefore locking it against actuation or sliding.

Such kinematic release of the selector lever from the shift carriage, and the simultaneous blocking of the shift carriage, relative to the enclosure of the actuating device, leads to configurations known art with mechanically complicated and sophisticated blocking mechanisms with numerous meshing parts. Hereby, it is also required, due to potentially larger misapplied forces by the selector lever, that especially the blocking configuration needs to be designed as very robust, causing the use of more expensive parts.

Another problem of the described, known actuating devices is the fact that, because of a robust design and construction of the blocking mechanism, due to potentially larger forces, the selector lever kinetics becomes stiffer and requires more force, therefore, reducing the ease of use.

SUMMARY OF THE INVENTION

Based on this background, the inventive task is to create an actuating device for an automatic transmission with the blocking mechanism to inhibit the separation between selector lever and transmitting element, while the selector lever is positioned in the sequential shift lane, can be constructively, significantly simplified, whereby, at the same time, actuation under all operating conditions should be safe and smooth. Another task of the invention is to reduce the cost, as compared to the known state of the art, and simplify construction of the actuating devices.

This task is solved by an actuating device in accordance with this invention. Preferred embodiments are the subject of the dependent claims.

First and on its own and as known, the inventive actuating device serves the purpose of transmitting shift commands, especially to an automatic transmission of a motor vehicle.

Hereby, the invention comprises a selector lever positioned in a selector lane, between an automatic shift lane and a sequential shift lane, where it can be moved sideways back and forth, also a shift carriage for transmitting shift commands to a transmission-transmitting element, for instance to a rod configuration or to a pull cable link, as well as a separating device for separating transmission of force between the selector lever and the shift carriage. Also, the actuating device, by itself, comprises a known actuator lock device through which the selector lever position—to achieve the shiftlock function—can be locked, in at least one selector lever position.

In this invention, the actuating device distinguishes itself by providing a lock device which is needed for the realization of the shiftlock function for locking the shift carriage. Hereby and in addition, the shift carriage, via the lock device, can be locked in the present position of the shift carriage and when the selector lever is positioned in the selector lane position.

This first results in a constructively, especially simple realization for locking the transmission actuation—meaning the blocking of the shift carriage or the transmission-transmitter element, respectively—while the selector lever is positioned in the sequential shift lane.

Compared to the state of the art, the inventive actuating device possesses a distinct advantage by using only a fraction of the number of needed parts and can be kept comparably simple and robust.

The invention takes advantage of the fact that the actuating devices for automatic transmissions, in most cases, already have a lock actuator which is needed to achieve the safety relevant shiftlock. The available lock actuator first hereby serves—by itself and known—in the sense of a shiftlock, to keep the selector lever engaged in park lock "P" or neutral position "N" as long as it is in the actual selector lever position, until the driver actuates the brake pedal and keeps it activated, while he moves the selector lever away from the park lock position or neutral position, respectively. Hereby, possible uncontrolled rolling of the vehicle, upon shifting to a drive position, is avoided.

In addition and in accordance with the invention, the available lock actuator of the shiftlock is also used to keep the shift carriage of the actuation device fixed, when the selector lever is moved along the selector lane from the automatic shift lane into the sequence shift lane.

This means, in other words, that the sophisticated lock mechanisms, where the shift carriage according to the state of the art during lateral motion of the selector lever from the automatic shift lane into the sequential shift lane gets disengaged and blocked, can be eliminated, due to this invention, in favor of a constructively, significantly simpler, more robustly designed lock device for the shift carriage which works on the basis of the already available lock actuator of the shiftlock.

Therefore, it is only necessary, constructively by itself, to achieve with known means—i.e., through a separation device which is designed as gate guide separating the transmission of force between the selector lever and the shift slide—that the selector lever is kinematically separated from the transmission-transmitter element or the shift carriage, respectively, during its sideway motion from the automatic shift lane into the sequential shift lane.

At the same time, the shift carriage becomes locked, in accordance with the invention, by means of the lock actuator of the shiftlock.

This invention can be enabled, independent of how the lock actuator is constructed and positioned, as long as it is possible to block the shift carriage by means of the lock actuator. In accordance with a specially preferred embodiment of the invention, the lock actuator is designed as an electro-mechanic actuator with a movable anchor pin.

This embodiment creates a very simple and robust configuration. The anchor pin can be electro-mechanically deployed and can be directly inserted into the corresponding lock chambers provided with the shift carriage. Hereby, the different lock chambers, for the different locking positions of the shiftlock, can simply be designed and arranged next to each other (locked in park position or neutral position, respectively, with the selector lever), as well as for locking the transmission—transmitter element—when the selector lever is positioned in the sequential shift lane.

According to another preferred embodiment of this invention, the actuation device is designed to actuate the lock actuators, when shifting the selector lever into the sequential shift lane or into the position "M" (manual gear shift). Hereby, it is made sure that the lock carriage and the transmission-transmitter element are blocked at the time, when the selector lever is moved completely into the sequential shift lane. Unnecessary activation of the lock device is avoided, upon touching or partial movement of the selector lever along the selector lane, due to this particular embodiment.

An additional specially preferred embodiment of this invention comprises the separating device for separating, in principal, the force between the selector lever and the shift carriage and the device is a symmetrical H-shaped gate notch, in the shift carriage, and a gate pin linked with the selector lever.

Based on the H-Shaped gate notch, the actuating device can be adjusted with only minimal modifications, for vehicles with right steering or vehicles for left steering, because the H-shaped gate notch offers an average force transmitting range for the automatic shift lane, between the gate pin and the shift carriage, and for the manual gear change in either a left or right a motion range of the gate pin, with reference to the average force transmitting range.

Depending on whether a vehicle is equipped with left hand steering or right hand steering, a suitable shift gate for the selector lever and the left or the right range of motion in the H-shaped gate notch can be applied. In other words, according to this inventive actuation device, no changes need to be made with regard to the separation device or the lock device for vehicles with right hand steering or vehicles with left hand steering.

Finally, an additional preferred embodiment provides that the selector lever fitting, the selector lever bearing, and the gate pin fitting are formed as a single part. This results in an especially simple constructive design, which is produced in a cost-effective manner with a minimal number of parts; and direct and play-free transfer of force is obtained due to the single part design of the important, force transmitting elements of the actuation unit.

BRIEF DESCRIPTION OF THE DRAWINGS

In the following, the invention is presented, based on examples of the embodiments in the drawings. It is shown in:

FIG. 1 is an isometric representation of an embodiment of an actuating device in accordance with the present invention;

FIG. 2 is a shift scheme of the actuation device, according to FIG. 1, including the automatic shift lane and the sequential shift lane;

DETAILED DESCRIPTION OF THE PREFERRED EMBODIMENTS

Figure 3:
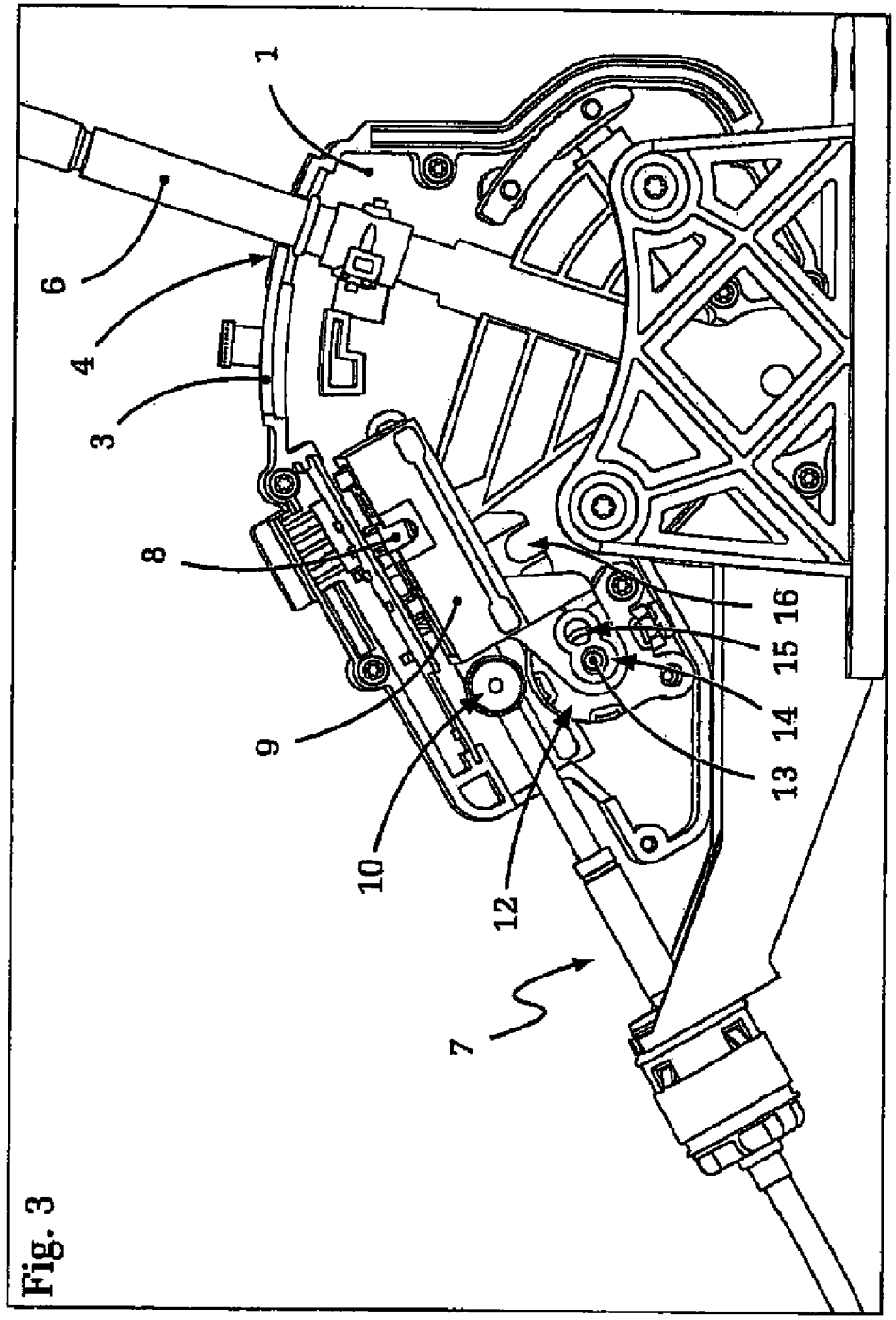
FIG. 3 is a side view of the actuation device, in accordance with FIG. 1.

In FIG. 1, an embodiment of an actuation device for an automatic transmission, in accordance with the present invention, is presented. First shown in the presentation of FIG. 1 is an open lever housing 1 having a lever bearing 2, a sliding lane 3, 4, as well as a lever 6 which accommodates a knob, not shown, of the selector lever of the actuator device.

FIG. 1 also shows the lever end of the transmitting element, in the form of an embodiment of a pull cable 7, which transfers the shift commands of the actuating device to the transmission of the vehicle. FIG. 2 shows the shift scheme of the actuating device. One can recognize the automatic shift lane 3, the sequential shift lane 4 for manually changing the shift position, as well as the selector lane 5 for the changing, by way of the lateral movement of the selector lever, between the automatic shift lane 3 and the sequential shift lane 4.

The transmission of the shift commands, in the presented embodiment, occurs—when the selector lever, as shown here, is in the automatic shift lane 3—from the selector lever 6 through a gate pin 8 to a shift carriage 9, and from the shift carriage 9 through a linkage 10 and a pull cable 7 to the transmission. The selector lever fitting, or selector lever bearing 2 and the gate pin fitting, are constructed as a single plastic piece.

The shift carriage 9 has an H-shape gate with notches 11 to accommodate and transmit the shift commands of the selector lever 6, via the gate pin 8 on the shift carriage 9. If the selector lever is positioned in the automatic shift lane 3, as shown in FIG. 1, the gate pin 8 is located within the small, centered beam of the H-shaped gate notches 11, with the opposite surfaces of the gate notch 11 in the shift carriage 9 on both sides. In this centered, relative position of the gate pin 8 in the gate notch 11 of the shift carriage 9, all swivel motions of the selector lever 6 are transmitted to the shift carriage 9, practically play-free, and therefore to the pull cable 7.

If, on the other hand, the selector lever 6 moves—through lateral movement along the selector lane 5—from the automatic shift lane 3 into the sequential shift lane 4, the gate pin 8 follows that lateral swivel motion as well. The gate pin 8, due to the lateral motion of the selector lever 6 is therefore moved, along the selector lane 5 to the sequential shift lane 4 and into a rear section of the H-shaped gate notch 11, as referenced in the drawing. However, transmission of these shift motions of the selector lever 6 to the shift carriage 9 does not occur anymore because the available effective length of the expanded H-shaped gate notch 11 equals the available shift travel of the shift lever 6 within the sequence shift lane 4 for tapping with the shift lever 6.

In other words, it means that with movement of the selector lever 6, from the automatic shift lane 3 into the sequential shift lane 4, there is no kinetic separation between the gate pin 8 and the selector lever 6, on one hand, and the shift carriage 9 and the pull cable 7, on the other hand. Therefore, the selector lever 6 can be moved forward and backward, in the sequential shift lane 4, and hereby initiate related shift commands for a manual gear change which are electronically forwarded to the transmission, without hereby moving the shift carriage 9 or the pull cable 7.

To ensure that the state of the transmission (in this case the shift position "M") does not change as long as the selector lever 6 remains in the sequential shift lane 4, a lock device—like those in the state of the art—is required which ensures that the pull cable 7 remains in position as long as the selector lever 6 is moved back into the automatic shift lane 3 and, therefore, the gate pin 8 again meshes with the shift carriage 9. For this purpose and in accordance with the invention, the actuating devices for automatic transmissions often use available electromagnetic lock actuators 12.

The electromagnetic lock actuator 12 is needed to enable a shiftlock-safety function whereby the shiftlock function ensures that a drive step can only be engaged by shifting from position "P" to "N," when the brake pedal is activated. For enabling the shiftlock function, the shift carriage 9 has two lock chambers 14 (for the shift position "N") and 16 (for the shift position "P", see FIG. 3), with which the movable anchor of the lock actuator 12 can engage. Once the anchor is inserted into one of the lock chambers 14, 16, the shift carriage 9, and also therefore the pull cable 7, are fixed in their position and shift commands cannot be transmitted through the pull cable 7 to the transmission. Also, the selector lever 6 is locked by the gate pin 8, in this case meshed with the shift carriage 9, so that the driver receives a haptic signal that the shiftlock device is active.

The lock actuator 12 with its movable anchor 13, as well as the lock chambers 14, 15, 16, positioned at the shift carriage 9, are clearly shown in FIG. 3. In accordance with the invention, the lock chamber 14 corresponds with an additional lock option for the shift carriage 9, which becomes effective at the point when the selector lever 6, as shown in FIG. 3, is positioned in the center position "M" of the sequential shift lane 4, or in the selector lane 5 (compare with FIG. 2). At the same time, the gate pin 8 is disengaged from the shift carriage 9, which means that no power transmission can take place between selector lever 6 and the shift carriage 9 or the pull cable 7, respectively, as long as the selector lever 6 is respectively positioned in the sequential shift lane 4 or the selector lane 5.

The lock chamber 16 of FIG. 3, as known in the state of the art however, serves for the locking the shift carriage 9 and the pull cable 7, as well as the selector lever 6 in the park lock position "P" thus enabling the shiftlock.

Figure 4:
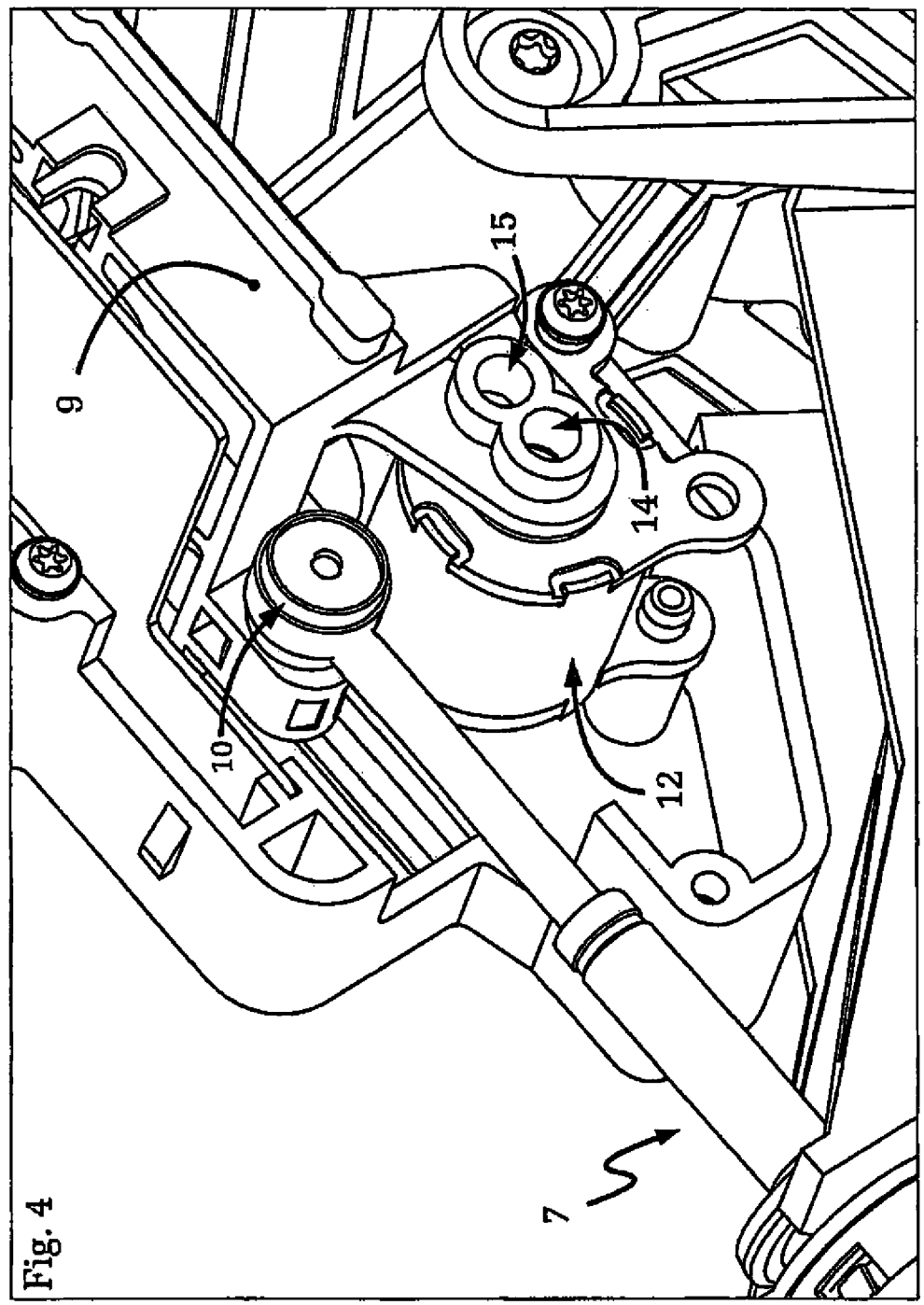
FIG. 4 is a corresponding representation of the actuating device of FIG. 1 in an enlarged view in accordance with FIGS. 1 and 3.

The enlarged presentation of FIG. 4 shows the electromagnetic lock actuator 12 as well as both of the lock chambers 14 and 15. Hereby, the lock chamber 15 serves to lock the shift carriage 9, the pull cable 7 and the selector lever 6 in the neutral position "N", while the lock chamber 14, in accordance with the invention, is used to lock the shift carriage 9 and the pull cable 7 when the selector lever 6 is positioned in the sequential shift lane 4 or in the selector lane 5, respectively (compare with FIG. 2).

The result clearly presents that the invention creates an actuating device, for an automatic transmission, in which the locking motions required for the separation, between the selector lever and the transmitting element as well as locking the transmitting element during a manual gear change, becomes significantly simpler.

The actuating device, in accordance with the invention, also has a robust construction and is easy to operate. In addition, in comparison to actuating devices which are known in the state of the art, significant cost savings can be achieved.

REFERENCE CHARACTER LIST

1 Lever Housing
2 Lever Bearing
3 Automatic Shift Lane
4 Sequence Shift Lane
5 Selector Lane
6 Selector Lever
7 Pull Cable
8 Gate Pin
9 Shift carriage
10 Pull Cable Steering Link
11 Gate Notch
12 Lock Actuator
13 Electro Magnetic Anchor
14, 15, 16 Lock Chamber

The invention claimed is:
1. An actuating device for transmitting a shift command to an automatic transmission of a vehicle, the actuating device comprises:
   a movable selector lever (6) being movable within an automatic shift lane (3), a sequential shift lane (4) and a selector lane (5), the sequenial shift lane (4) interconnecting the automatic shift lane (3) with the sequential shift lane (4), and the selector lever (6) being biased to issue the shift command ,
   a shift carrier (9) for receiving and transmitting the shift command to a transmission transmitting element (7),
   a separating device (8, 11) for separating the transmitted force between the selector lever (6) and the shift carrier (9), the separating device (8, 11) comprises a single gate pin (8) which is fixed with respect to the selector lever (6), and the shift carrier (9) comprises an H-shaped channel (11), the gate pin (8) is received within the H-shaped channel (11) and movement of the gate pin (8) is confined within the H-shaped channel (11) and is dependent on the issued shift command, and
   a lock actuator (12) for locking the selector lever (6) in at least one selector lever position, and when the shift carrier (9) is positioned in at least one of the selector lane (5) and the sequential shift lane (4), the lock actuator (12) enables locking of the shift carrier (9) so that a shifting of the transmission is carried out electronically.

2. An actuating device for shifting an automatic transmission of a vehicle, the actuating device comprising:
- a selector lever (6) being shiftable within a selector lane (5), an automatic shift lane (3) and a sequential shift lane (4), the selector lane (5) interconnecting the automatic shift lane (3) and the sequential shift lane (4);
- a shift carriage (9) being coupled element (7) for transmitting shifting force thereto, and the shift carriage (9) comprising an H-shaped channel (11);
- a gate pin (8) being fixedly coupled to the selector lever (6) and being accommodated within the H-shaped channel such that the selector lever (6) and the gate pin (8) move in unison and movement of the selector lever (6) within the automatic shift lane (3), the sequential shift lane (4) and the selector lane (5) corresponds to movement of the gate pin (8) within the H-shaped channel (11), and the transmission of the shifting force from the selector lever (6) to the transmission linkage element (7) being interrupted when the gate pin (8) is moved from a center position of the H-shaped channel (11) to facilitate electronic shifting of the transmission; and
- a lock actuator (12) being actuatable to lock movement of the shift carriage (9), and the lock actuator (12) locking movement of the shift carriage (9) at least when the selector lever (6) is moved into the selector lane (5).

3. The actuating device according to claim 1, wherein the selector lever (6), a selector lever bearing (2) and a gate pin holder, which retains the gate pin (8), are constructed as a single piece and rigidly fixed with respect to each other.

4. The actuating device according to claim 1, wherein the lock actuator (12) is an electromagnetic actuator having an anchor pin (13).

5. The actuating device according to claim 1, wherein the actuating device activates the lock actuator (12) when the selector lever (6) is moved into either the sequential shift lane (4) or a manual gear shift position (M).

6. The actuating device according to claim 2, wherein the selector lever (6), a selector lever bearing (2) and a gate pin holder, which retains the gate pin (8), are constructed as a single piece and rigidly fixed with respect to each other.

7. The actuating device according to claim 2, wherein the lock actuator (12) is an electromagnetic actuator having an anchor pin (13).

8. The actuating device according to claim 2, wherein, when the selector lever (6) is moved into either the sequential shift lane (4) or a manual gear shift position (M), the actuating device activates the lock actuator (12).

\* \* \* \* \*